United States Patent [19]

Bauman

[11] Patent Number: 5,680,571

[45] Date of Patent: Oct. 21, 1997

[54] MULTI-PROCESSOR DATA PROCESSING SYSTEM WITH MULTIPLE, SEPARATE INSTRUCTION AND OPERAND SECOND LEVEL CACHES

[75] Inventor: Mitchell Anthony Bauman, Circle Pines, Minn.

[73] Assignee: Unisys Corporation, Blue Bell, Pa.

[21] Appl. No.: 579,683

[22] Filed: Dec. 28, 1995

[51] Int. Cl.[6] .............................. G06F 13/00; G06F 12/08
[52] U.S. Cl. ..................... 395/449; 395/444; 395/446; 395/448; 395/450; 395/457; 395/468; 395/469; 364/DIG. 1
[58] Field of Search ........................ 395/449, 452, 395/453, 444, 446, 448, 450, 457, 468, 469

[56] References Cited

U.S. PATENT DOCUMENTS

| | | | |
|---|---|---|---|
| 4,442,487 | 4/1984 | Fletcher et al. | 395/449 |
| 4,445,174 | 4/1984 | Fletcher et al. | 395/448 |
| 4,521,851 | 6/1985 | Trubisky et al. | 395/375 |
| 4,551,799 | 11/1985 | Ryan et al. | 395/467 |
| 4,701,844 | 10/1987 | Thompson et al. | 395/446 |
| 4,707,784 | 11/1987 | Ryan et al. | 395/467 |
| 4,719,568 | 1/1988 | Carrubba et al. | 395/450 |
| 5,023,776 | 6/1991 | Gregor | 395/449 |
| 5,095,424 | 3/1992 | Woffinden et al. | 395/450 |
| 5,197,139 | 3/1993 | Emma et al. | 395/417 |
| 5,206,945 | 4/1993 | Nishimukai et al. | 395/403 |
| 5,212,781 | 5/1993 | Shah | 395/449 |
| 5,222,224 | 6/1993 | Flynn et al. | 395/471 |
| 5,241,641 | 8/1993 | Iwasa et al. | 395/449 |
| 5,276,848 | 1/1994 | Gallagher et al. | 395/448 |
| 5,307,477 | 4/1994 | Taylor et al. | 395/403 |
| 5,386,547 | 1/1995 | Jouppi | 395/449 |
| 5,423,016 | 6/1995 | Tsuchiya et al. | 395/450 |
| 5,490,261 | 2/1996 | Bean et al. | 395/448 |
| 5,524,233 | 6/1996 | Milburn et al. | 395/468 |
| 5,555,382 | 9/1996 | Thaller et al. | 395/293 |

*Primary Examiner*—Frank J. Asta
*Attorney, Agent, or Firm*—Charles A. Johnson; Mark T. Starr

[57] ABSTRACT

A multiprocessor data processing system having store-through first-level caches with separate instruction and operand sections and a store-in second-level cache that is shared between the processors and which has separate instruction and operand sections. Dual second-level caches, each mappable to all of shared memory, enhance cache performance. The second-level cache memory space is divided into a plurality of segments, with each segment having a dedicated instruction tag memory, a dedicated operand tag memory, a dedicated instruction cache memory, and a dedicated operand cache memory. The segments may be addressed in parallel to further enhance cache performance.

13 Claims, 13 Drawing Sheets

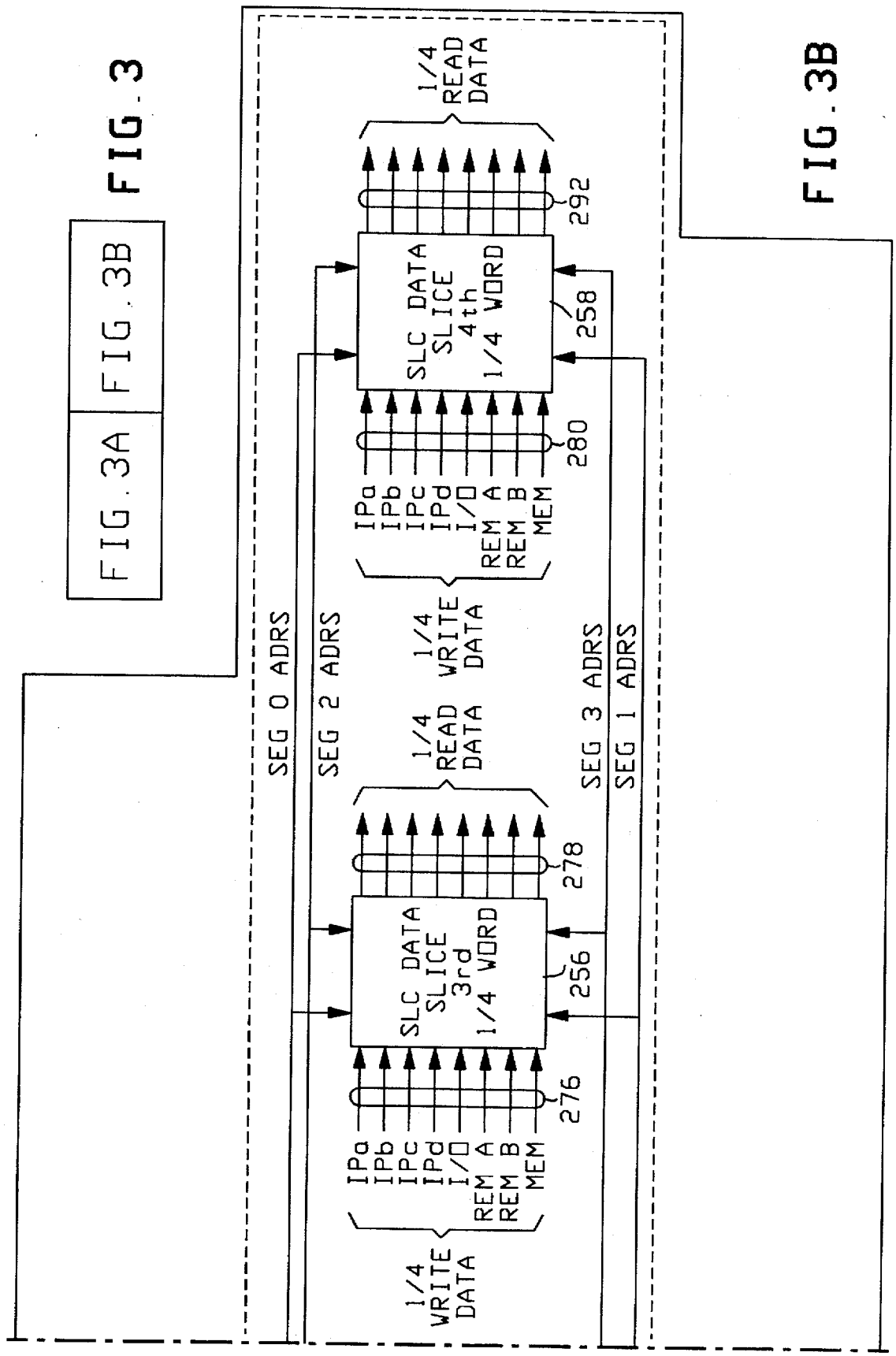

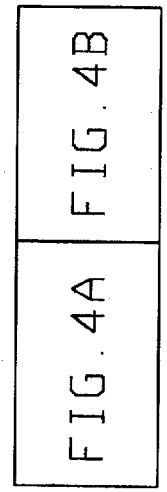
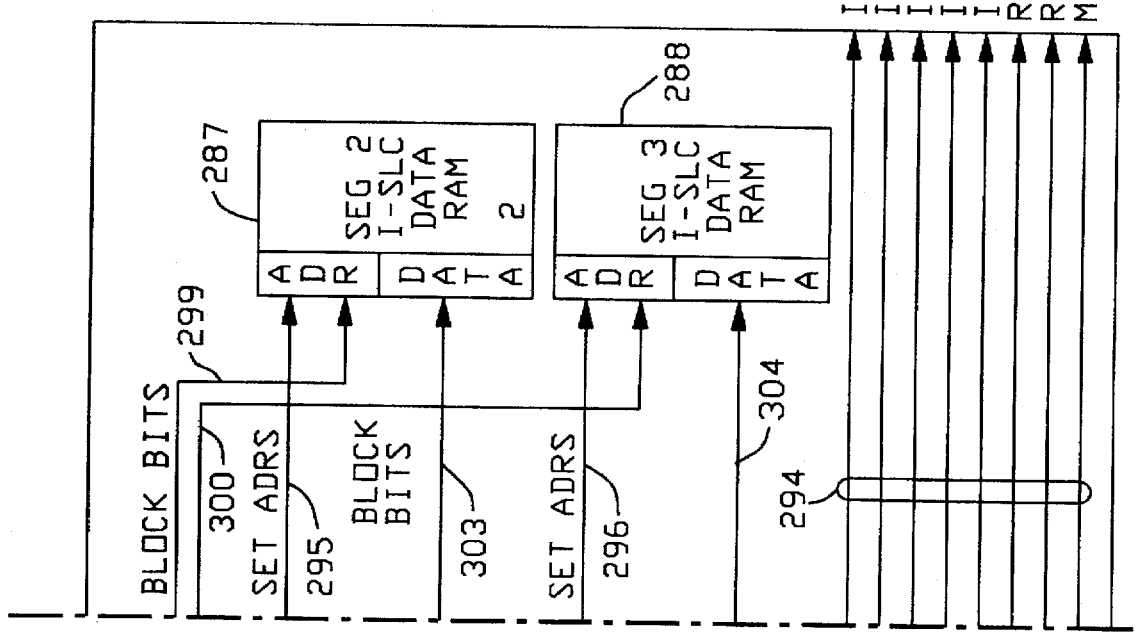
FIG. 4B

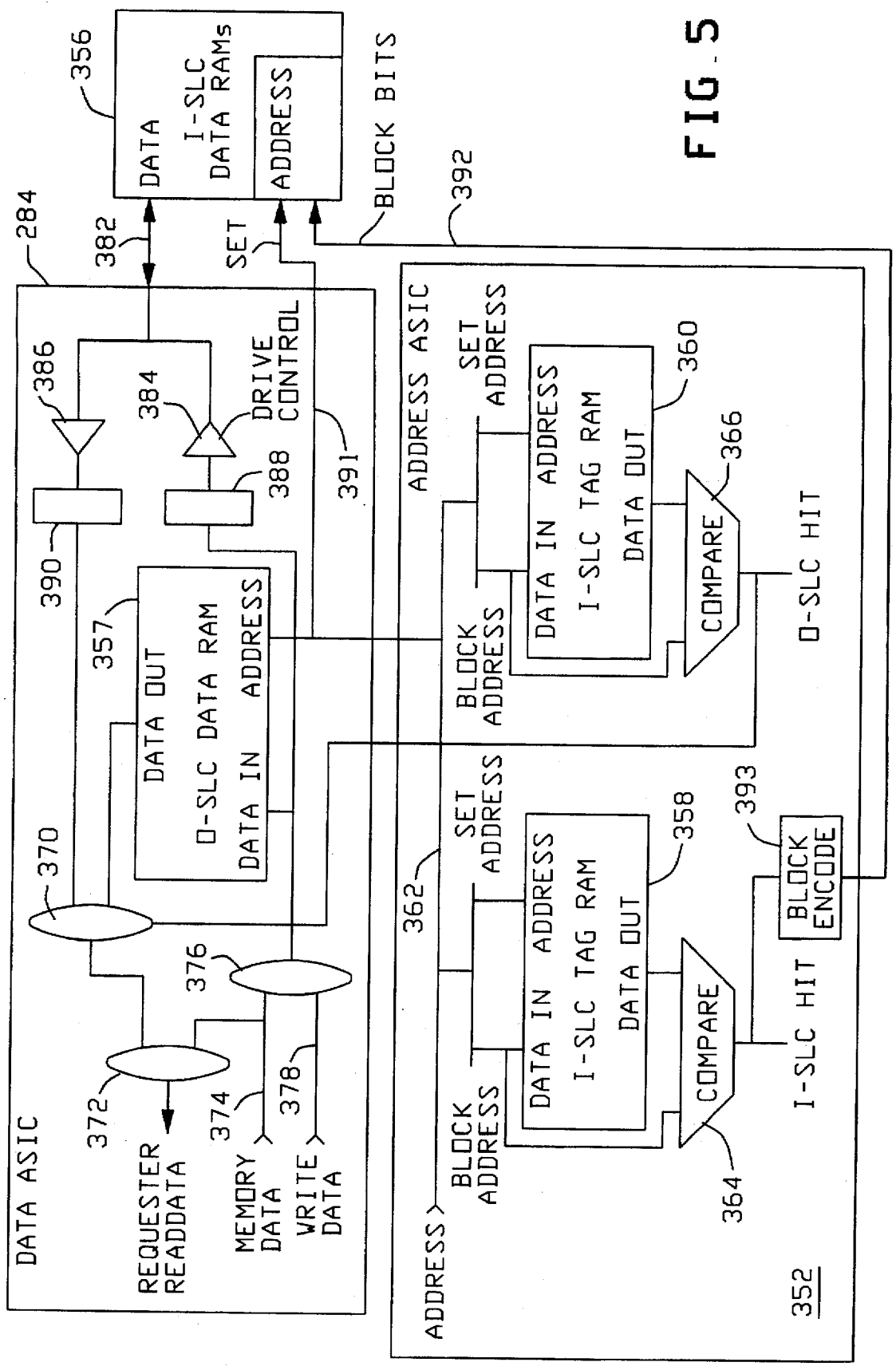

MULTI-PROCESSOR DATA PROCESSING SYSTEM WITH MULTIPLE, SEPARATE INSTRUCTION AND OPERAND SECOND LEVEL CACHES

CROSS-REFERENCE

This patent application is related to the co-pending U.S. patent application Ser. No. 08/579,897, entitled, A MULTI-PROCESSOR DATA PROCESSING SYSTEM WITH MULTIPLE SECOND LEVEL CACHES MAPABLE TO ALL OF ADDRESSABLE MEMORY, filed concurrent herewith by Bauman et al., and which is assigned to the assignee of the present invention.

BACKGROUND

1. Field of the Invention

This invention generally relates to cache architectures for data processing systems and more particularly to a shared memory multi-processor data processing system having a plurality of second-level caches, where each of the second-level is comprised of a separate instruction second-level cache and a separate operand second-level cache.

2. Description of the Prior Art

Multilevel storage hierarchies have been used to enhance the performance of data processing systems. Smaller higher speed memories, often called cache memories, are located in the storage access path between an instruction processor and the system's main memory. Instructions and operands present in the cache memories can be referenced more quickly than instructions and operands located in the system's main memory.

Various cache structures have been used to gain assorted advantages from cache memories. U.S. Pat. No. 5,386,547 to Jouppi shows a cache architecture within a single processor data processing system. The cache architecture of Jouppi shows what are referred to by Jouppi as first and second-level caches. The first and second-level caches swap data, thereby seeking to gain some level of associativity from a direct-mapped cache. Jouppi also shows multi-level cache architecture with separate instruction and operand caches. The objective sought for having separate instruction and operand caches is to separate the application of the cache replacement algorithms to each of the separate caches.

U.S. Pat. No. 5,423,016 to Tsuchiya et al, illustrates a store-through first-level cache that is split into a separate instruction and operand section. The second-level cache stores both instructions and operands and is shared between multiple processors. Therefore, the second-level cache of Tsuchiya makes no distinction between instructions and operands, and its caching algorithms are the same for both types of references.

SUMMARY OF THE INVENTION

The present invention overcomes the shortcomings of the prior art by providing a multiprocessor data processing system that has store-through first-level caches associated with each of the processors, each of the first-level caches having a separate instruction cache and operand cache, and a second-level cache that is shared between the processors where the second-level cache also has a separate instruction cache and operand cache.

The Jouppi cache architecture does not provide a workable solution for a multiprocessor shared memory data processing system. Jouppi does not disclose how cache coherency could be maintained in a multiprocessor shared memory system. In addition, Jouppi has a high overhead cost associated with swapping data between the first-level and second-level cache.

The Tsuchiya cache architecture illustrates a multi-level cache architecture for a multiprocessor data processing system. However, Tsuchiya has many remote interfaces required for second-level cache access, and additionally, mixes instructions and operands in the second-level cache.

A primary objective of the present invention is to improve the cost/performance ratio for a multi-processor data processing system. This objective and others are achieved by effectively matching the appropriate cache algorithms and technology to the different characteristics associated with instructions and operands in a second-level cache.

The characteristics associated with instruction references as compared to operand references, relative to a second-level cache that supports store-through first-level caches, are very different. First, instruction references are always read operations to the second-level cache. Instruction references also conform closely to the principle of locality of reference. Instructions are rarely modified by the instruction reference generator, and therefore have a backup copy in memory. As a result, the second-level cache does not need to provide additional error correction logic for instructions. Eliminating error correction logic for instructions reduces access time.

Operand references can be both read and write operations. Relative to the second-level cache, a significant majority of the operations are write operations where there are store-through first-level caches. Operand references to the second-level cache do not benefit as well as do instructions from having a large cache. This is because operands do not follow the locality of reference principle as well as instructions. The main benefit that the second-level cache provides for operands is the ability to quickly handle the write operations that flow through the first-level caches and to share the modified data with other processors in the multiprocessor environment. Because most second-level caches operate in a strife-in mode, the second-level cache has the most recent updated copy of the operand and there is no backup copy available in the system memory. Therefore, error correction is required to ensure reliable operation.

Historically, cache RAM structures have been implemented in two ways: one is using discrete SRAM devices that are somewhat limited in functionality and very limited in interconnect options, but have good density and cost factors; and the second way is using embedded RAM structures within ASICs. The embedded RAM structures have very good functionality characteristics and minimal interconnect constraints, but have very high cost factors for a given density.

A major advantage of SRAM devices is that they are available in very large capacities, and as a result, when used in a cache design, they provide for having a very high cache hit rate. However, in order to minimize package size and maximize density, many SRAMs that are used in cache systems have one set of data lines for both read and write data. As a result, they operate using bi-directional bus techniques, whereby dead cycles are inserted when changing bus direction (e.g., changing from a read direction to a write direction). The dead cycles slow down system performance.

In contrast, the embedded RAMs within an ASIC have very good interconnection options because of their inherent dense routing capability within the ASIC. Therefore, the embedded RAMs have separate data read and write lines and no dead cycles are required to change bus direction as in the SRAM devices. In addition, embedded RAMs usually have faster access times because they are physically closer to the logic that they interface with. The embedded RAMs have a cost disadvantage as compared with the SRAM devices because they are unique designs with limited volume for each application.

The result of the above is that the characteristics associated with instructions map very well to SRAM devices. The bus can be preconditioned to the read direction and rarely needs to be changed to the write direction. Therefore, dead cycles associated with changing bus direction are greatly reduced. The slower access time associated with the SRAM devices is compensated for by not having to take time to do error correction. In addition, the larger cache size afforded by the SRAMs is more predominant for instructions.

The objectives of the present invention are achieved in a multiprocessor data processing system. The system includes a plurality of processors, each having a respective first-level cache. A second-level cache is between the first-level caches and the system memory in the storage hierarchy.

The first-level caches are store-through type caches, and are separated into an instruction cache and an operand cache. The second-level cache is a store-in cache that is shared between the processors. The second-level cache is also divided into a separate instruction cache and operand cache. Cache replacement is independent between the instruction second-level cache and the operand second-level cache.

In another aspect of the invention, if an instruction read is issued to the second-level cache, it is routed to both the operand second-level cache and to the instruction second-level cache. If an instruction read results in a hit in the operand second-level cache, the block from the operand second-level cache is returned to the requesting processor. This provides data integrity in the case where instructions and operands are intermixed within a block of cached data.

A further aspect of the invention has the second-level cache divided into a plurality of segments. Each of the segments is dedicated to caching a predetermined portion of addressable memory. Each of the segments further has an associated, respective operand tag memory and an associated, respective instruction tag memory. Further still, each of the segments has an associated, respective operand memory and an associated, respective instruction memory.

Dual second-level cache memories, each having an separate operand cache and instruction cache, define a further aspect of the invention. Each of the second-level cache memories is mappable to all of the system memory. The aforementioned aspects of the invention are also utilized in combination with the dual second-level cache memories.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF THE DRAWINGS

FIG. 5 is a more detailed block diagram of an Address ASIC, a Data ASIC, and a segment of Second-level Cache Storage:

DETAILED DESCRIPTION

Figure 1:
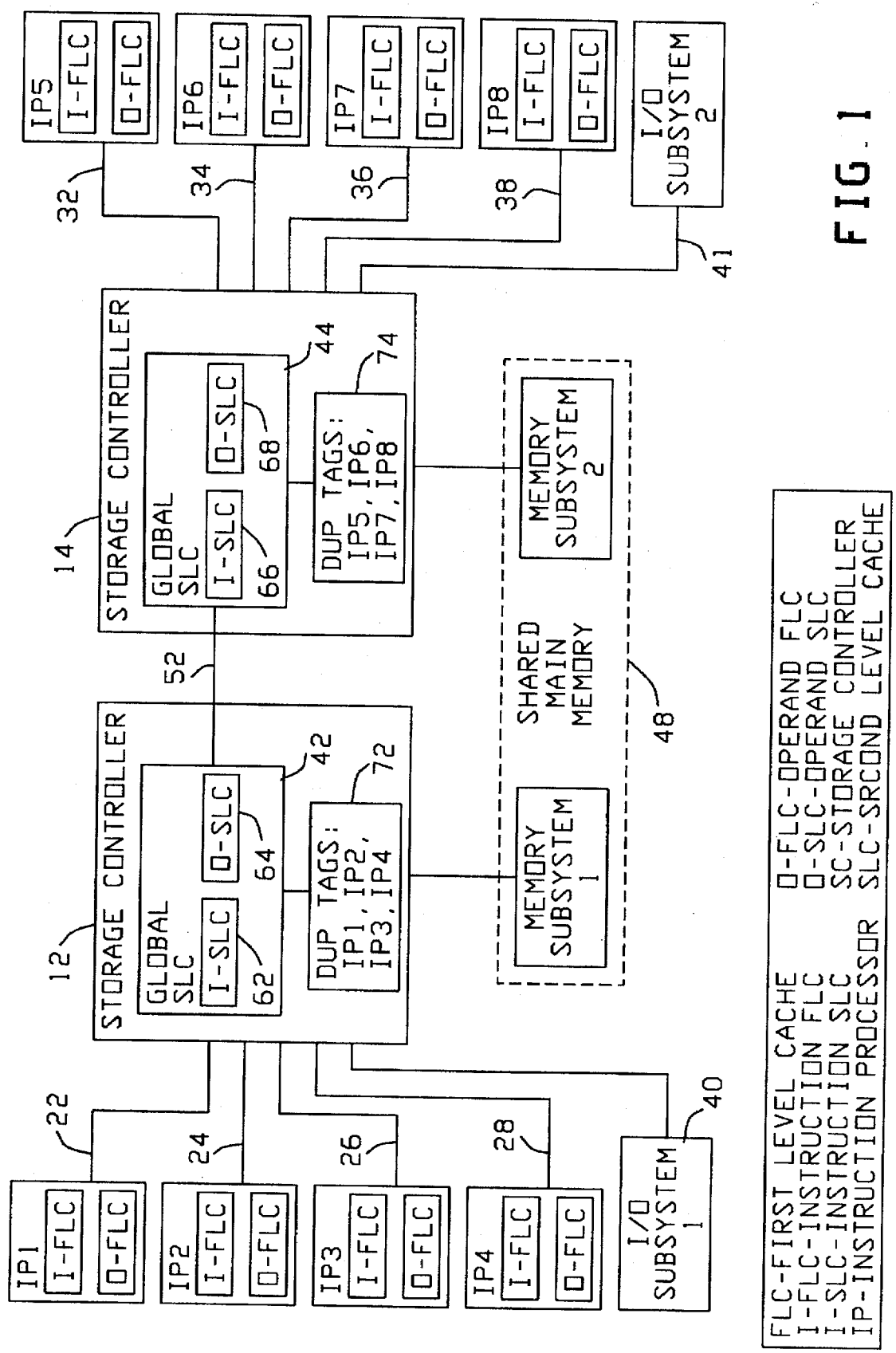
FIG. 1 is a block diagram of a multi-processor data processing system in which the present invention is embodied.

FIG. 1 is a block diagram of a multi-processor data processing system in which the present invention is embodied. The system includes eight Instruction Processors, IP1, IP2, IP3, IP4, IP5, IP6, IP7, and IP8, each having a dedicated store-through first-level cache. The first-level cache in each of the IPs includes a dedicated instruction cache and a separate dedicated operand cache. Both of the first-level caches are 8K words in size and are organized as 256 sets of four blocks, each block containing 8 words. The operand first-level cache operates as a store-through cache. This means that all write operands are stored into the operand first-level cache if the address is resident there and also passed on to the second-level cache. If the requested write operand is not resident in the operand first-level cache, the operand is not made resident in the operand first-level cache. Blocks of instructions and operands are made resident in the first-level caches on read-misses only.

The system of FIG. 1 has two Storage Controllers 12 and 14. Each of Storage Controllers is coupled to four of the IPs. Lines 22, 24, 26, and 28 illustrate the respective point-to-point couplings between the IP1, IP2, IP3, IP4 and Storage Controller 12. Lines 22, 24, 26, and 28 represent the collection of control, data, and address lines between the IPs and the Storage Controller. Lines 32, 34, 36, and 38 represent similar couplings between Storage Controller 14 and IP5, IP6, IP7, and IP8 respectively.

Memory requests can also come from components within the I/O Subsystem 1 and I/O Subsystem 2. I/O Subsystem I is coupled to Storage Controller 12 via Line 40, and I/O Subsystem 2 is coupled to Storage Controller 14 via Line 41.

Each of the Storage Controllers 12 and 14 has a respective Global SLC 42 and 44. The Global SLCs are described as "global" because each is mapable to the all of system's addressable memory. That is, the entire address range of the addressable memory is cacheable by each of the Global SLCs. The total available addressable memory is designated by Shared Main Memory 48. The Shared Main Memory is comprised of two Memory Subsystems, Memory Subsystem I and Memory Subsystem 2.

Global SLC 42 is coupled to Global SLC 44 in a point-to-point fashion as illustrated by Line 52. Line 52 is comprised of data, address, and control lines. Global SLC 42 may be accessed directly by IP1, IP2, IP3, and IP4, and indirectly accessed by IP5, IP6, IP7, and IP8. Similarly, Global SLC 44 may be accessed directly by IP5, IP6, IP7, and IP8, and indirectly by IP1, IP2, IP3, and IP4. If IP1 issues a read request for an address of Memory Subsystem 2 which is neither in IP1's FLC nor in Global SLC 42, the request is forwarded to Global SLC 44. If the requested address is present in Global SLC 44, the data of the requested address is returned to Global SLC 42. If the requested address is a miss in Global SLC 44, the request is forwarded to Memory Subsystem 2. The data is then returned to Global SLC 42. Note that no replacement of data takes place in Global SLC 44 as a result of requests from Global SLC 42.

Storage Controller 12 and Global SLC 42 are "local" relative to IP1, IP2, IP3, IP4, and I/O Subsystem 1, and are "remote" relative to IP5, IP6, IP7, IP8, and I/O Subsystem 2. Similarly Storage controller 14 and Global SLC 44 are "local" relative to IP5, IP6, IP7, IP8, and I/O Subsystem 2, and are "remote" relative to IP1, IP2, IP3, IP4, and I/O Subsystem 1. The Global SLCs may be viewed as dedicated to the requests of their respective local IPs and cooperating in servicing requests from the remote IPs. Global SLC 42 is dedicated to IP1, IP2, IP3, and IP4 in that the SLC storage is dedicated to caching data based on requests from IP1, IP2, IP3, and IP4. Similarly, Global SLC 44 is dedicated to IP5, IP6, IP7, and IP8 in that the SLC storage is dedicated to caching data based on requests from IP5, IP6, IP7, and IP8.

Each of the Global SLCs 42 and 44 has a respective, dedicated Instruction SLC (I-SLC) and a dedicated Operand SLC (O-SLC). Global SLC 42 includes I-SLC 62, and O-SLC 64, and Global SLC 44 includes I-SLC 66 and O-SLC 68. Each of the I-SLCs is implemented using high speed external SRAMs. The O-SLCs, on the other hand, are implemented using embedded SRAMs.

There are several advantages to separating the instructions from the operands in the SLC. One advantage is that performance is increased. Namely, the storing or reading of operands will not cause an aging of the instructions within the same set address. Operand and instruction contention has therefore been eliminated. A second advantage is that there is speed matching between instructions and operands in the SLC because of different respective requirements. This minimizes SLC latency. The I-SLC, using the external SRAMs has a longer access time. However, error correction is not required for reading instructions from the I-SLC, thereby saving time. Error correction is not required because the instructions in the I-SLC are only copies of that which is maintained in the Main Memory 48. If an error is detected, the copy from the Memory can be re-fetched to correct the error. While the O-SLC does require error correction because it may have the only copy in the system, its access time is shortened because the O-SLC storage is an embedded SRAM.

Cache coherency is accomplished with two primary mechanisms. The store-through FLCs use an invalidate mechanism, and the Global SLCs 42 and 44 use a combination of invalidate and tracking which Global SLC was the last to modify cached data ("last-modified"). The FLC invalidate mechanism has two major components: a valid file located in the respective IPs, and the respective Duplicated Tags that are located in the respective Storage Controllers 12 and 14. Note that Duplicate Tags for IP1, IP2, IP3, and IP4 are designated as block 72 in Storage Controller 12 and Duplicate Tags for IP5, IP6, IP7, and IP8 are designated as block 74 in Storage Controller 14. The Duplicated Tags are essentially a copy of the respective FLC tags (not shown). The respective Duplicate Tag is updated when an IP updates its FLC tag, namely, on a read-miss of the FLC. When any local IP performs a write operation, the IP will write to its respective O-FLC if the address is resident and then pass the write operation to the local Storage Controller. The local Storage Controller then searches the local Duplicate Tags. If there is a match, the appropriate IP is notified as to which set and which block needs to be invalidated in its FLC tag. The IP then clears out the associated valid bit in its valid file. This forces the next read by that IP to result in a miss in its FLC and the updated information being fetched from the local Global SLC. If the write address is not present in the FLC, the same invalidation scenario occurs, however, no replacement occurs in the FLC.

A technique referred to as last-modified is used by the Global SLCs 42 and 44 to coordinate cache coherency. In order for a Global SLC to allow a write to occur in its storage, it must first be designated as being the Global SLC that last-modified the specified address. Only one Global SLC is allowed to be designated as being the last to modify a particular address. If a Global SLC is already designated as having last-modified an address when a write operation for the address is received, the write operation is processed immediately. If the Global SLC is not designated as having last-modified the address when the write operation is received, then the remote Global SLC is checked to see whether the remote Global SLC has a copy of the data. As the remote Global SLC is checking for a copy, it is also invalidating the remote Duplicate Tags and the remote FLC tags. If the remote Global SLC has a copy of the data, the data is returned to the local SLC and the remote Global SLC invalidates its tags. Therefore, all remote caches have been purged of the requested block. The local Global SLC is then designated as having last-modified the block, and any subsequent write operations from the local processors do not require invalidation to be performed at the remote caches. This method works especially well with instructions because there can be copies in both of the Global SLCs. If both Global SLCs have copies of the block, there is no remote access penalty for an FLC miss.

Figure 2:
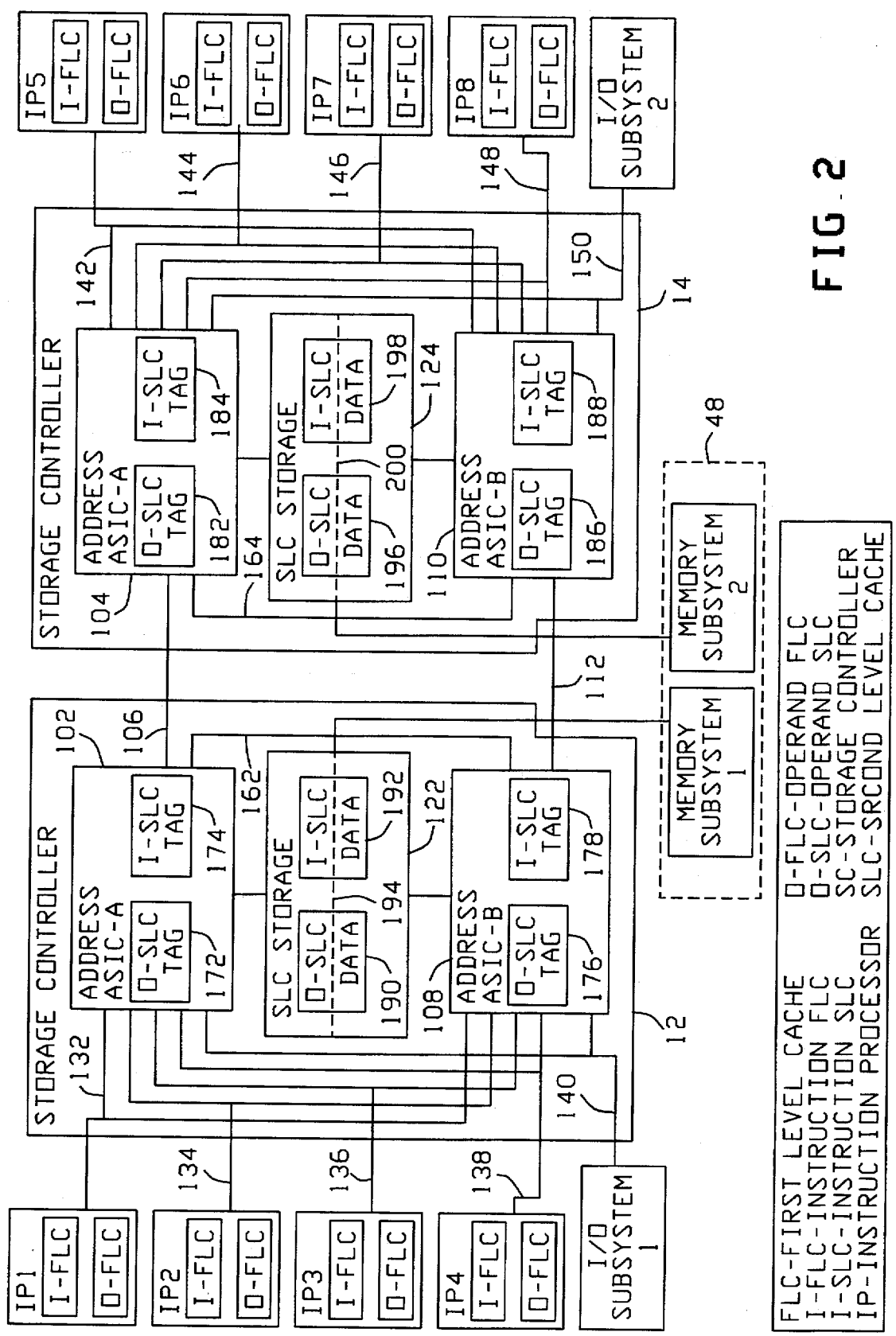
FIG. 2 is a more detailed block diagram of the storage controls and interconnections between the components of the Storage Controllers.

FIG. 2 is a more detailed block diagram of the storage controls and interconnections between the components of the Storage Controllers 12 and 14. Each of the Storage Controllers has two Address ASICs, Address ASIC-A and Address ASIC-B. Address ASIC-A 102 of Storage Controller 12 is directly coupled to Address ASIC-A 104 of Storage Controller 14 via Line 106. Similarly Address ASIC-B 108 is directly coupled to Address ASIC-B 110 via Line 112. Lines 106 and 108 are comprised of unidirectional data, address, and control lines. For the respective Global SLCs 42 and 44, each of the Address ASICs 102, 104, 106, and 108 contain a Tag for ½ of the addressable memory space provided by system Memory 48. Specifically, Address ASIC-A 102 contains control and a tag for managing ½ of the system's addressable memory for caching in SLC Storage 122, and Address ASIC-B 108 contains control and a tag for managing the other half of the system's addressable memory for caching in SLC Storage 122. Address ASIC-A 104 and Address ASIC-B 110 perform similar functions with respect to SLC Storage 124.

Address ASIC-A 102 and Address ASIC-B 108 are directly coupled to IP1, IP2, IP3, IP4, and I/O Subsystem 1 as is respectively shown by Lines 132, 134, 136, 138, and 140. Lines 132, 134, 136, 138 and 140 include unidirectional address, data, and control lines. Address ASIC-A 102 includes Duplicate Tags (not shown) for IP1's FLC and for IP2's FLC, and Address ASIC-B 108 includes Duplicate Tags (not shown) for IP3's FLC and for IP4's FLC. IP5, IP6, IP7, IP8, and I/O Subsystem 2 are directly coupled to Address ASIC-A 104 and Address ASIC-B 110 in a similar manner as shown by Lines 142, 144, 146, 148, and 151). Address ASIC-A 104 contains Duplicate Tags (not shown) for IP5's FLC and for IP6's FLC, and Address ASIC-B 110 contains Duplicate Tags (not shown) for IP7's FLC and for IP8's FLC.

Address ASIC-A 102 is directly coupled to Address ASIC-B 108 via Line 162. Line 162 is comprised of unidirectional control lines that provide for transmission of invalidation requests to be processed against the Duplicate Tags that are respectively included in each of Address ASIC-A and Address ASIC-B. Line 164 is a similar coupling between Address ASIC-A 104 and Address ASIC-B 110.

Each of the Address ASICs has a respective Operand SLC Tag and a Instruction SLC Tag. Specifically, Address ASIC-A 102 has O-SLC Tag 172 and I-SLC 174, Address ASIC-B 108 has O-SLC Tag 176 and I-SLC Tag 178, Address ASIC A 104 has O-SLC Tag 182 and ISLC Tag 184, and Address ASIC-B 110 has O-SLC Tag 186 and I-SLC Tag 188. O-SLC Tag 172 indicates which addresses are present and valid in half of the O-SLC Data 190 portion of SLC Storage 122, and O-SLC Tag 176 indicates which addresses are present and valid in the other half of the O-SLC Data 190. I-SLC Tag 174 and I-SLC Tag 178 are used similarly for the I-SLC Data 192 portion of SLC Storage 122. Dashed line 194 represents the division between the half of SLC Storage 122 controlled by Address ASIC-A 102 and the half controlled by Address ASIC-B 108.

Each of the Tags 172, 174, 176, 178, 182, 184, 186 and 188 have respectively associated age-bits, valid-bits, and written-bits that are used for implementing a least-recently-used cache replacement algorithm. The least-recently-used cache replacement that occurs for each of the Tags is independent of the other Tags.

In Storage Controller 14, O-SLC Tag 182 indicates which addresses are present and valid in half of the O-SLC Data 196 portion of SLC Storage 124, and O-SLC Tag 186 indicates which addresses are present and valid in the other half of the O-SLC Data 196. I-SLC Tag 184 and ISLC Tag 188 are used similarly for the I-SLC Data 198 portion of SLC Storage 124. Dashed line 200 represents the division between the half of SLC Storage 124 controlled by Address ASIC-A 104 and the half controlled by Address ASIC-B 110.

Figure 3A:
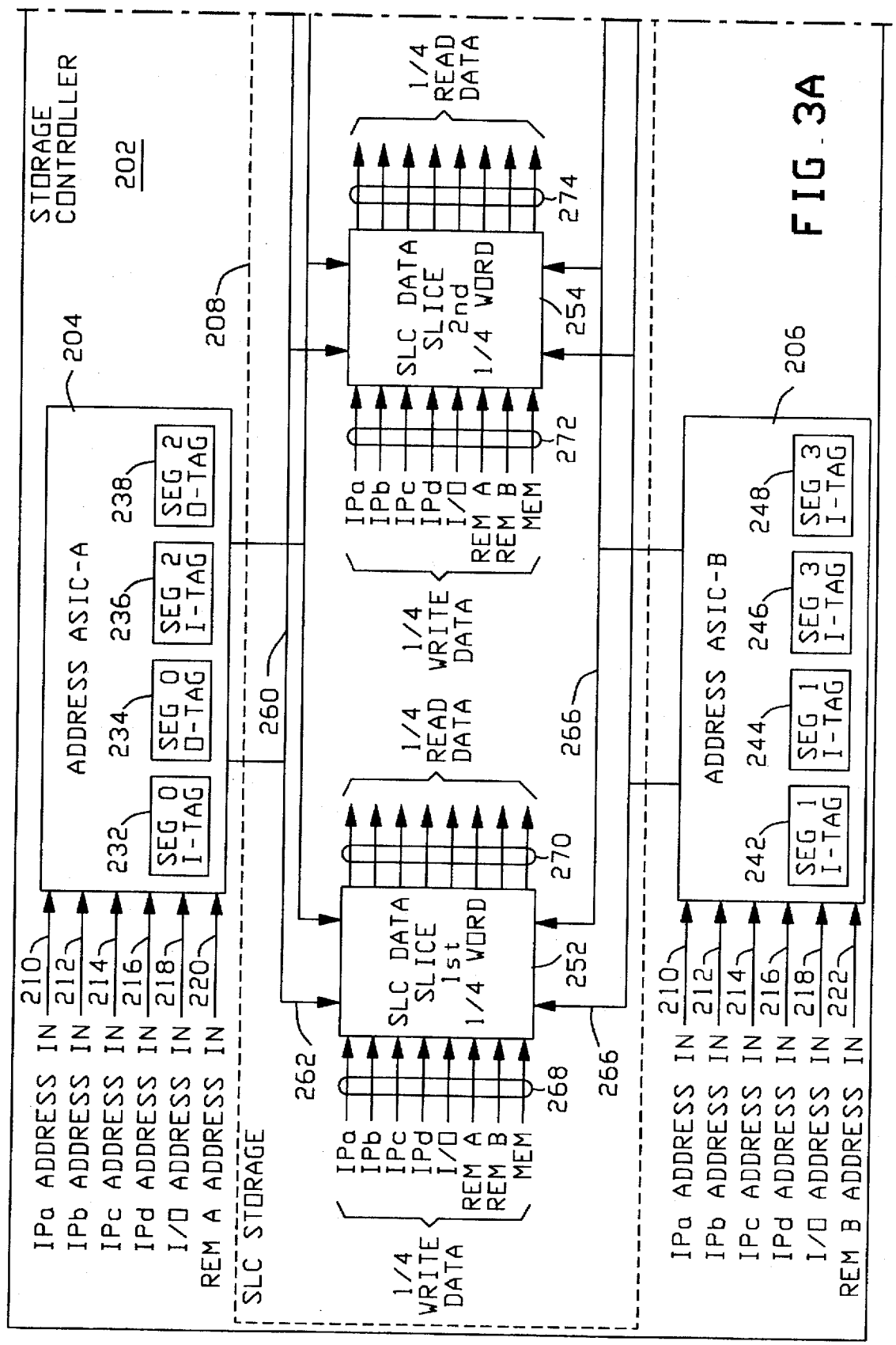
FIG. 3 is a block diagram of the addressing between Address ASIC-A and Address ASIC-B and the associated Second-level Cache Storage.

FIG. 3 is a block diagram that shows the addressing between Address ASIC-A and Address ASIC-B and the associated Second-level Cache Storage. The Storage Controller 202 of FIG. 3 depicts one of the Storage Controllers 12 or 14 of FIG. 2. Address ASIC-A 204 represents the respective Address ASIC-A 102 or 104 within the Storage Controller, and Address ASIC-B 206 represents the respective Address ASIC-B 108 or 110 within the Storage Controller. SLC Storage 208 represents the respective SLC Storage 122 or 124 within the Storage Controller.

Address inputs to each of Address ASIC-A 204 and Address ASIC-B 206 include address requests from each of the local IPs, designated as IPa, IPb, IPc, and IPd and shown respectively as Lines 210, 212. 214, and 216. Address requests from an I/O Subsystem (Subsystem 1 or Subsystem 2) are shown as input on Line 218. Address requests to Address ASIC-A 204 and Address ASIC-B 206 from the corresponding remote Address ASICs are respectively shown as Lines 220 and 222.

SLC Storage 208 is comprised of four independently controlled segments referred to as Segment 0, Segment 1, Segment 2, and Segment 3. Address ASIC-A 204 controls access to Segment 0 and Segment 2, and Address ASIC-B 206 controls access to Segment 1 and Segment 3. Correspondingly, Address ASIC-A has a Segment 0 Instruction Tag 232, a Segment 0 Operand Tag 234, a Segment 2 Instruction Tag 236, and a Segment 2 Operand Tag 238. Address ASIC-B has a Segment 1 Instruction Tag 242, a Segment 1 Operand Tag 244, a Segment 3 Instruction Tag 246, and a Segment 3 Operand Tag 248. Each of the respective Tags 232, 234, 236, 238, 242, 244, 246, and 248 indicate the addresses that are present and valid in the Segments 0–3. Generally, each of Segment 0, Segment 1, Segment 2, and Segment 3 maps to ¼ of the system Memory 48.

Each word of Memory that is cached in one of the segments of the SLC Storage 208 is stored across four separate devices. The four SLC Data Slices 252, 254, 256, and 258 represent the respective devices for storing ¼ of a word. SLC Data Slice 252 stores the first quarter of a word, SLC Data Slice 254 stores the second quarter of a word, SLC Data Slice 256 stores the third quarter of a word, and SLC Data Slice 258 stores the fourth quarter of a word.

Address ASIC-A 204 is coupled to each of the SLC Data Slices 252, 254, 256, and 258 via two sets of address lines 260 and 262, one for Segment 0 addresses and one for Segment 2 addresses. Similarly, Address ASIC-B 206 is coupled to each of the SLC Data Slices via two sets of address lines 264 and 266, one for Segment 1 addresses and one for Segment 3 addresses. It will be recognized that reading a word of data from SLC Storage 208 entails reading ¼ of the word from each of the SLC Data Slices.

Each of the SLC Data Slices 252, 254, 256, and 258 has respectively dedicated data write lines for writing data to SLC Storage 208, and respectively dedicated data read lines for reading data from SLC Storage. There are dedicated lines read and write lines for each of the processors and requesters that references the SLC Storage. Specifically, each of IPa, IPb, IPc, IPd, remote Address ASIC-A, remote Address ASIC-B, and the Memory 48 has dedicated read and write data lines. The write data lines to SLC Data Slice 252 are collectively referenced as 268, and the read data lines from SLC Data Slice 252 are collectively referenced as 270. Similarly, SLC Data Slices 254, 256, and 258 have respective write and read data lines that are collectively referenced as 272, 274, 276, 278, 280, and 282.

Figure 4A:
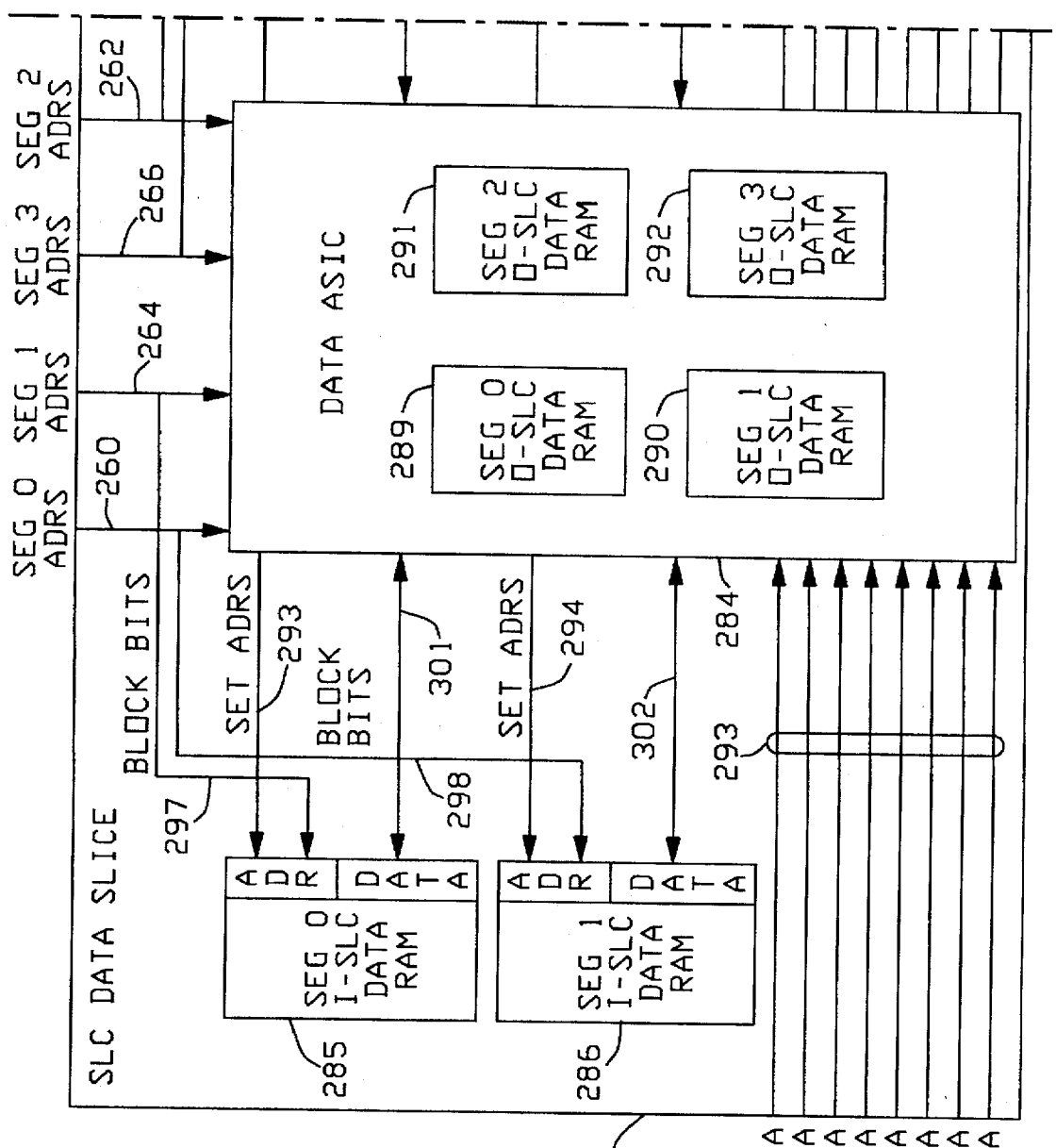
FIG. 4 is a block diagram of the components that comprise a Second-level Cache Data Slice.

FIG. 4 is a block diagram of the components that comprise a Second-level Cache Data Slice. The SLC Data Slice 283 is illustrative of each of SLC Data Slices 252, 254, 256, and 258 of FIG. 3. The SLC Data Slice includes a Data ASIC 284 and four Instruction SLC Data RAMs 285, 286, 287, and 288, one for each of Segments 0, 1, 2, and 3. The Data ASIC includes control and Operand SLC Data RAMs 289, 290, 291, and 292, again, one for each of Segments 0, 1, 2, and 3.

The Data ASIC 284 controls the flow of data in to and out of the SLC Data Slice 283, both for the I-SLC Data RAMs 285, 286, 287, and 288, and for the O-SLC Data RAMs 289, 290, 291, and 292. The set of write data lines that are collectively referenced as 293 are illustrative of each of the write data lines in FIG. 3 that are referenced as 268, 272, 276, and 280. Similarly, the read data lines that are collectively referenced as 294 are illustrative of each of the read data lines of FIG. 3 that are referenced as 270, 274, 278, and 282.

The address lines 260, 262, 264, and 266 are input to the Data ASIC 284. A Segment 0 set address on Line 260 is routed to the Segment 0 O-SLC Data RAM 289, a Segment 1 set address on Line 264 is routed to Segment 1 O-SLC Data RAM 290, a Segment 2 set address on Line 262 is routed to Segment 2 O-SLC Data RAM 291, and a Segment 3 set address on Line 266 is routed to Segment 3 O-SLC Data RAM 292. The set addresses are also routed to the respective I-SLC Data RAMs 285, 286, 287, and 288 as shown by set address Lines 293, 294, 295, and 296. To address a particular block within a set in a I-SLC Data RAM, block bits are encoded by the respective Address ASIC 204 or 206 based on the results of searching the respective Instruction Tags 232, 236, 242, or 246. The block bits routed to the I-SLC Data RAMs are respectively shown by Lines 297, 298, 299, and 300. The timing of the arrival of the block bits at the I-SLC Data RAM coincides with the arrival of the set address from the Data ASIC 284.

The Data ASIC 284 controls reading data from and writing data to the I-SLC Data RAMs 285, 286, 287, and 288 as is respectively shown by data Lines 301, 302, 303, and 304. The interface between the Data ASIC and an I-SLC Dam RAM operates using one set of data lines for both read and write data. As a result, the interface operates using bi-directional bus techniques, whereby dead cycles are inserted when changing the bus direction. However, because the I-SLC Data RAMs are SRAM devices, they are available in very large capacities, and when used in a cache design, result in a cache having very high hit rates. The high hit rates greatly reduce the need to change the direction of the bus for reading and writing to the I-SLC Data RAM. Therefore, the disadvantage of the bi-directional interface for the I-SLC Data RAM has been overcome by storage capacity of the device.

FIG. 5 is a more detailed block diagram of an Address ASIC, a Data ASIC, and a segment of Second-level Cache Storage. The Address ASIC 352 corresponds to one of Address ASIC-A 204 or Address ASIC-B 206 of FIG. 3. The Instruction-SLC Data RAM 356 corresponds to a respective one of the Instruction-SLC Data RAMs 285, 286, 287, or 288 of FIG. 4. The O-SLC Data RAM 357 corresponds to one of the O-SLC Data RAMs 289, 290, 291, or 292 of FIG. 4.

For each segment controlled by the Address ASIC 352 there are two second-level cache tag structures. I-SLC Tag RAM 358 is the second-level cache instruction tag for one of the segments, and O-SLC Tag RAM 360 is the second-level cache operand tag for the corresponding one of the segments. Note that the tags for the other segment controlled by the Address ASIC 352 are not shown.

The address on Line 362 is one of input addresses supplied to the Address ASIC 352 (e.g., 210, 212, 214, 216, 218, or 220). The address on Line 362 drives each of I-SLC Tag RAM 358 and O-SLC RAM 360. Each of the Tag RAMs 358 and 360 are embedded in the Address ASIC 352. At each Tag RAM, the address is split into a set address and a block address. The set address at each of the Tag RAMs may be of different widths to accommodate the different sizes of caches in the I-SLC Data RAM 356 and O-SLC Data RAM 357. The pair of set addresses are used to access both the I-SLC Tag RAM 358 and the O-SLC Tag RAM 360 simultaneously. Compare logic circuits 364 and 366 compare the block addresses read from the respective Tag RAMs 358 and 360 with the input block address. If the request is for an instruction as indicated by a function code associated with the requested address, and there is a hit in the I-SLC Tag RAM and not in the O-SLC Tag RAM, the data read out of the I-SLC Data RAMs 356 is selected via Selector 370 and routed to the requester using the read data Line 372. If the requested address is a hit in the O-SLC Tag RAM, irrespective of the results of the Compare 364, the data read from the O-SLC Data RAM is selected by Selector 370. If the function code indicates an operand read, the results of the Compare 364 are ignored and if there is a hit in the O-SLC Tag RAM, the data read from the O-SLC Data RAM is selected by Selector 370 and routed back to the requester. If an operand is to be written and there is a hit in the I-SLC Tag RAM, the I-SLC block is invalidated and the data is written into the O-SLC Data RAM. All writes occur in the O-SLC Data RAM.

If an instruction read results in a miss in both the I-SLC Tag RAM 258 and the O-SLC Tag RAM 360, then a block is read from memory, written into the I-SLC Data RAM 356, and routed back to the requester. Memory Data Line 374 carries the data read from memory and being routed back to the requester via Line 372. Selector 376 selects data on Line 374 when blocks are being replaced. Write data on Line 378 is selected when an operand is being written in the O-SLC Data RAM 357. If an operand read or write operation results in a miss in both SLC Tags 358 and 360, the block is read from memory, replaced in the O-SLC Data RAM, and routed to the requester (if the function was to read an operand).

For operand write misses, the block that is read from memory is merged with the new updated data from the requester and written into the O-SLC Data RAM 357.

The SLC Tag RAMs 358 and 360 are respectively updated to indicate new information that is stored in the O-SLC Data RAM 357 and I-SLC Data RAMs 356. In terms of aging old information in the SLC Data RAMs 357 and 356, the data from the I-SLC Data RAM 356 does not need to be written back to memory because no write operations ever occur in the I-SLC Data RAMs. The O-SLC Data RAM 357 can be written to and therefore must be written to memory if it has been modified. There is a bit in the O-SLC Tag RAM for each referenced block that designates whether the block was modified.

The I-SLC Data RAMs 356 consist of discreet SRAM components, while the O-SLC Data RAM 357 is implemented using ASIC embedded RAM structures.

The cache replacement policy in the exemplary embodiment, and therefore what data is present in the I-SLC Data RAMs 356 versus the O-SLC Data RAM 357, is based on the function code information that is passed from the requesting processor to the Storage Controller 202. The function code indicates whether the request came from an instruction first-level cache or an operand first-level cache. If the request came from the instruction first-level cache, then the data is replaced in the I-SLC Data RAM 356 on a cache miss. On the other hand, if the request came from an operand first-level cache, the data is replaced into the O-SLC Data RAM 357. Because there is a separate I-SLC Tag RAM 358 and O-SLC Tag RAM 360, the aging algorithms are separate and independent.

Error code correction is not required for data read from the I-SLC Data RAMs 356 because there is always an up-to-date copy of the instruction in the memory. This saves time in the access path for instruction references to the second-level cache. Additionally, the data Bus 382 is conditioned in the read direction. This minimizes the time penalty associated with reversing the direction of the data Bus. The data Bus is only required to be reversed when the cache replacement to the I-SLC Data RAM occurs. Drive control Circuits 384 and 386 control the direction of the data Bus 382, and Registers 388 and 390 respectively latch data to be written to and data read from the I-SLC Data RAMs.

The operand second-level caches requires error code correction because it is operated as a post-store cache, and therefore, may have the most up-to-date data relative to the data in the memory. However, the time required for error code correction is compensated for by embedding the O-SLC Data RAM in the Data ASIC 354 and reducing off-chip crossings.

The input address that drives the I-SLC Data RAMs 356 arrives from two sources. The set address is routed via Line 391 from the Data ASIC 284, and the block bits are routed to the I-SLC Data RAMs via Line 392 from the Address ASIC 352. The block bits provided on Line 392 are encoded by the Block Encode logic 393 according to the results of the Compare logic 364. If the address reference was a hit in the I-SLC Tag RAM, the particular block within the set which contains the requested address is identified by the block bits provided by Block Encode 393.

Figure 6:
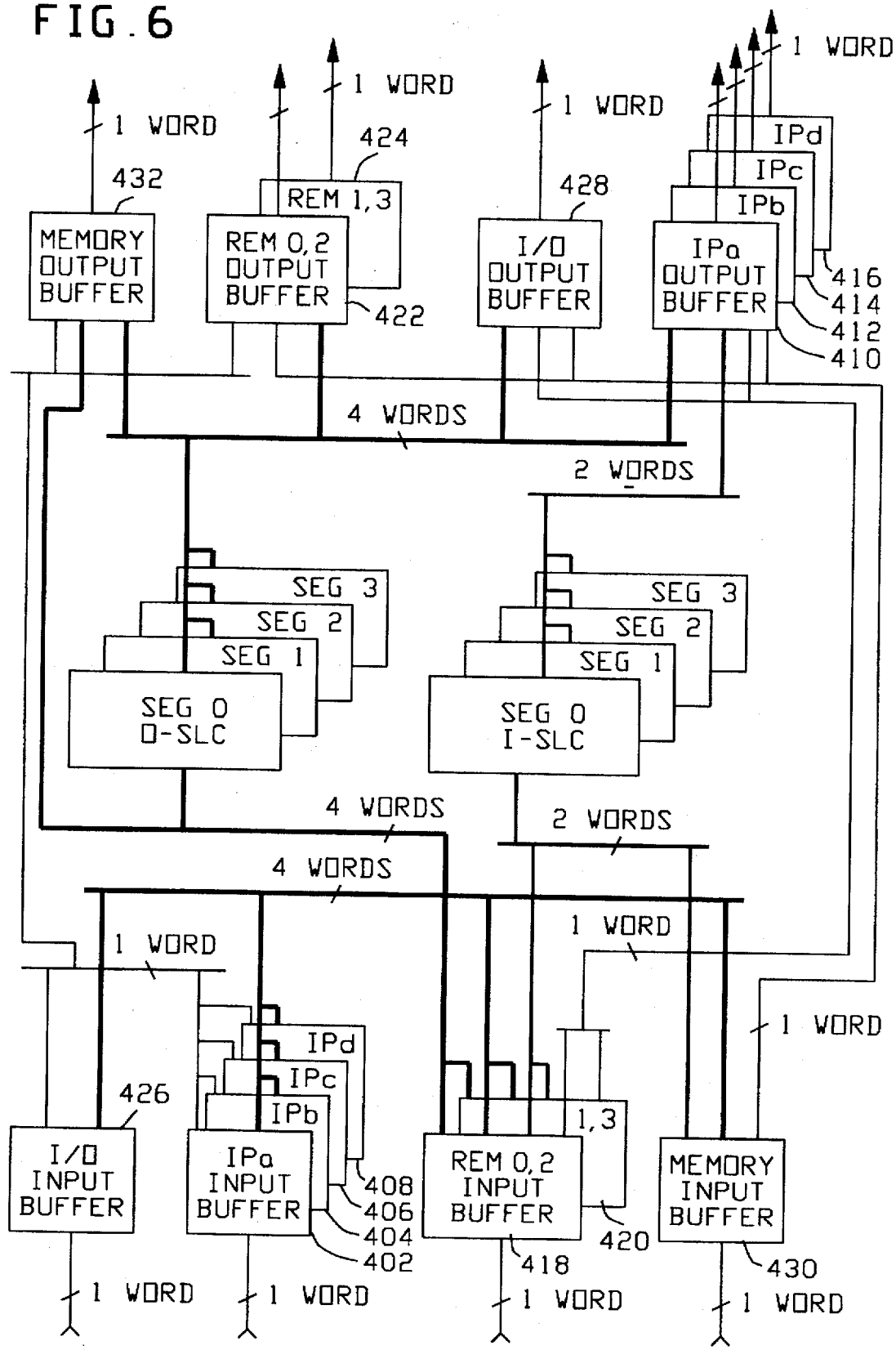
FIG. 6 is a block diagram that illustrates the data path between the requesting processors, the second-level cache, and the memory.

FIG. 6 is a block diagram that illustrates the data path between the requesting processors, the second-level cache, and the memory. Segments 0-3 of the operand second-level cache and Segments 0-3 of the instruction second-level cache are shared between the I/O Subsystem, IPa, IPb, IPc, IPd, and the remote Address ASIC. There is also an access path to and from the Memory Subsystem (1 or 2). The data to and from these requesters is structured as separate read and write interfaces.

Data is transferred to the Segments of the second-level cache from the requesters in either four or eight word packets. Data is always transferred to a requester from the second-level cache in eight word packets. Therefore it takes multiple clock cycles to transfer the information to or from the requesters. There is a four word data path to and from the O-SLC Segments 0-3 for each requester. The wide data path is cost effective because the data path is implemented using the dense routing capabilities of an ASIC and requires fewer cache cycles to handle each packet. There is only a two word interface from each of the IPs and remote requesters because the I-SLC Data RAM 356 is implemented with discreet SRAMs, and the ASICs have limited I/O capability.

To handle the different sizes of interfaces, speed matching buffers were used at each requester interface. Specifically, Input Buffers 402, 404, 406, and 408 respectively handle input data from each of the local IPs, and Output Buffers 410, 412, 414, and 416 respectively handle output data to the local IPs. Input Buffers 418 and 420 respectively handle input data from the remote Segments 0 and 2 and Segments 1 and 3, and Output Buffers 422 and 424 respectively handle output data to the remote Segments 0 and 2 and Segments 1 and 3. Input Buffer 426 handles input data from the local I/O Subsystem, and Output Buffer 428 handles output data to the local I/O Subsystem. Finally, Input Buffer 430 handles input data from the local Memory Subsystem, and Output Buffer 432 handles output data to the local Memory Subsystem.

Figure 7:
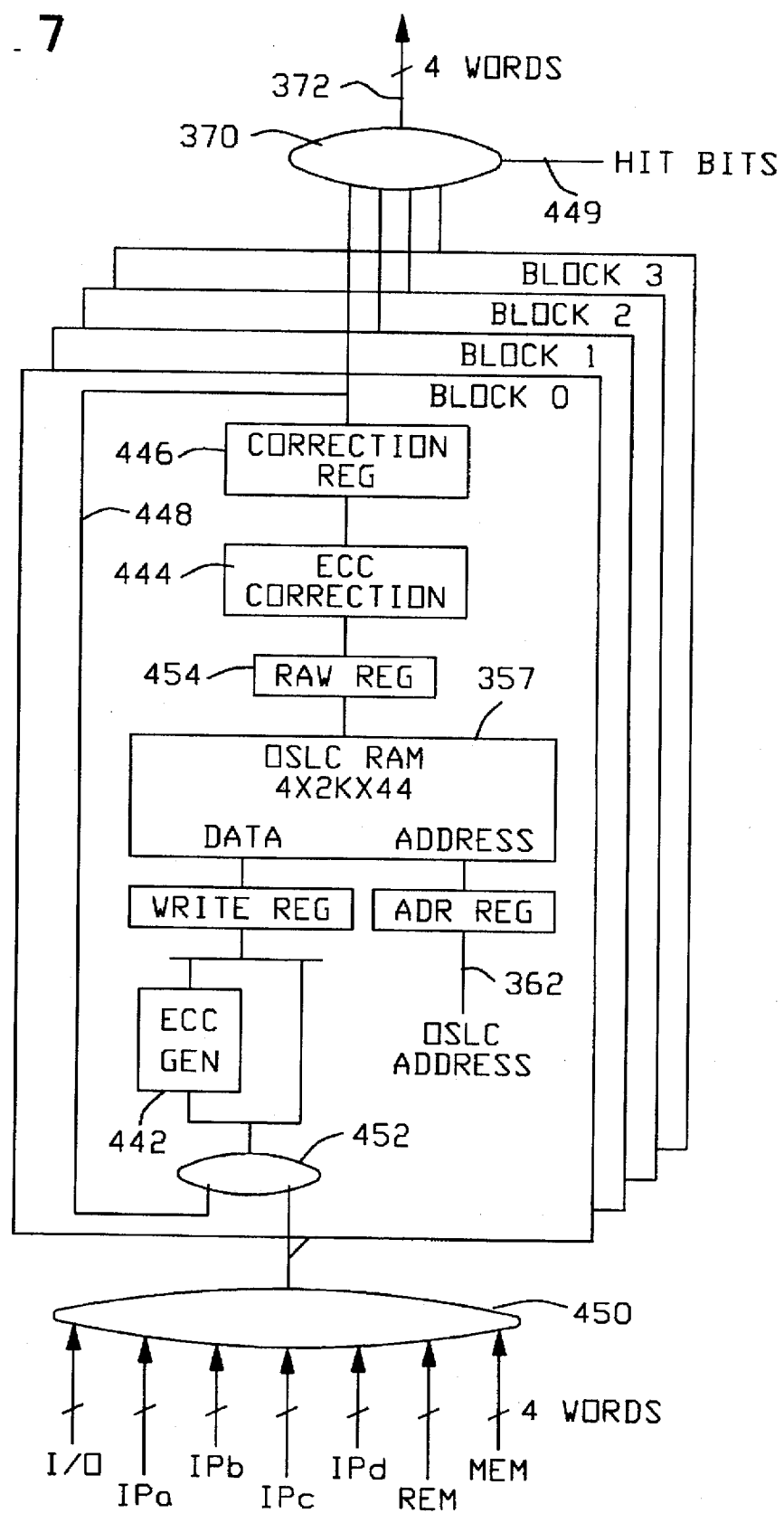
FIG. 7 is a more derailed diagram of one of the O-SLC segments shown in FIG. 6.

FIG. 7 is a more detailed diagram of one of the O-SLC segments shown in FIG. 6. The operand second-level cache is a set associative caches with four blocks per set. The blocks are designated as Blocks 0-4. Single bit error correction and double bit error detection are provided with the ECC Generation logic circuit 422 and ECC Correction logic circuit 444. Corrected data is latched in the Correction Register 446. Feedback Path 448 is provided for read/update write operations.

For read functions, both the O-SLC Tag RAM 360 and O-SLC Data RAM 357 are read together for each Block 0-3 using the set address information from the selected requester. The Hit Bits 449 from Compare logic circuit 366 are routed to Selector 370 of the Data ASIC 354 to select which block of data is to be routed to the respective Output Buffer 410, 412, 414, 416, 422, 424, 428, or 432.

Selector 450 selects from the respective Input Buffers 402, 404, 406, 408, 418, 420, 426, or 430 data to be written to the O-SLC Data RAM 357 according to the selected request. Selector 452 selects between data on the feedback Path 448 and data from the Selector 450. The feedback Path 448 is used for read-modify-write operations such as for writing part of a word and for writing part of a cache block. Raw data that is read from the O-SLC Data RAM 357 is latched in the Raw Data Register 454.

Figure 8:
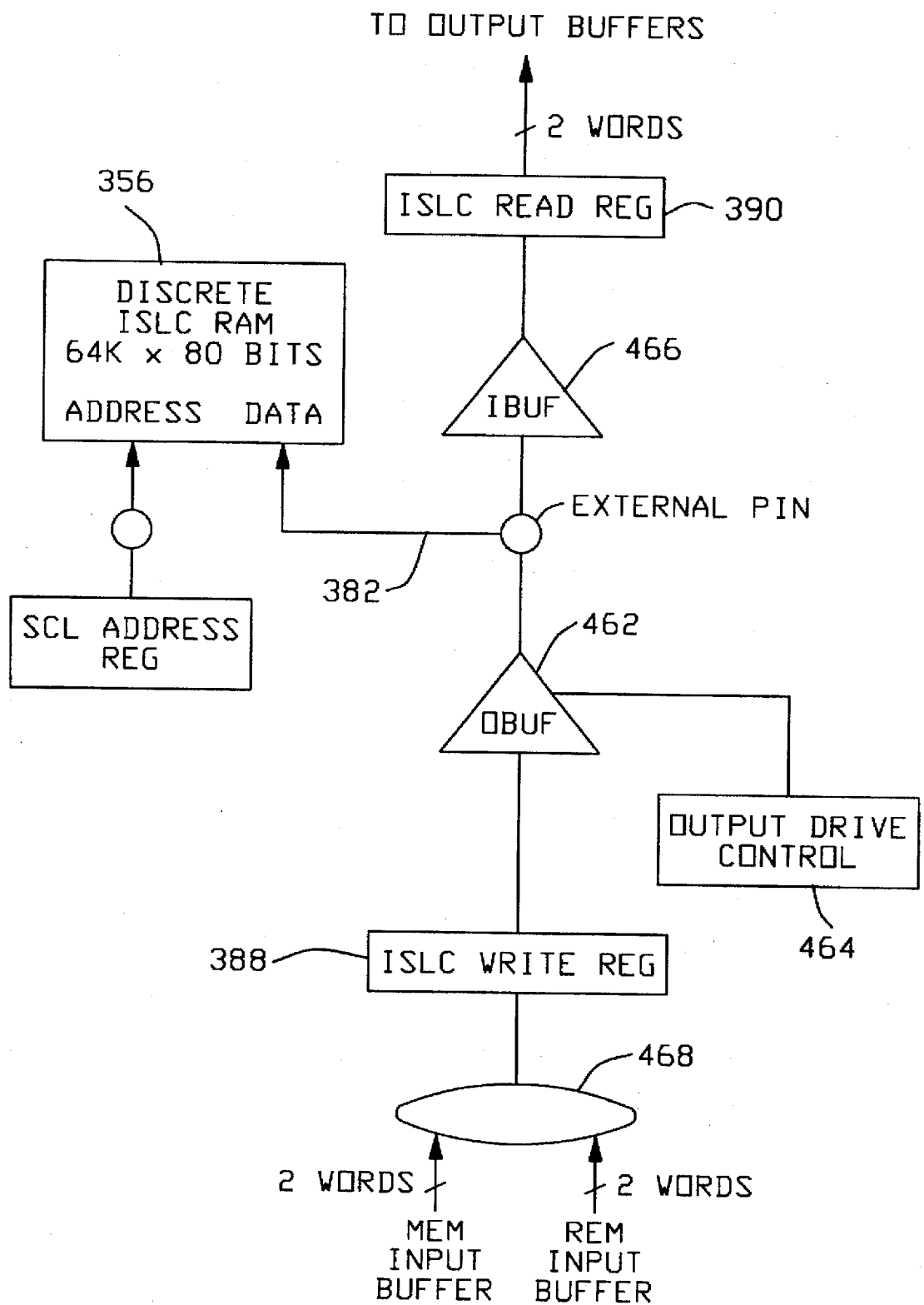
FIG. 8 is a more detailed diagram of the I-SLC segments shown in FIG. 5.

FIG. 8 is a more detailed diagram of the I-SLC segments shown in FIG. 6. The instruction second-level cache is implemented as a set associative cache with four blocks per set. However, unlike the operand second-level cache, the four blocks in each set of the instruction second-level cache are implemented within the I-SLC Data RAMs 356 and not with parallel block structures. This results in the look-up in the I-SLC Tag RAM 358 occurring before the reading of the I-SLC Data RAMs. The results of the Compare circuit 364 along with the input set address are used to address the I-SLC Data RAMs.

The data interface to the I-SLC Data RAM 356 is bi-directional as shown by Line 382. This requires a tri-state output buffer control for both the Data ASIC 354 and the I-SLC Data RAM 356. After initialization the Output Buffer 462 is disabled by Output Drive Control logic circuit 464, and the Input Buffer 466 is enabled. Therefore, for the majority of the time, when the instruction second-level cache is performing read functions, there is no time penalty for reversing the direction of the Bus 382 because the Bus is already in the read direction. Only after a miss when a new block needs to be written into the I-SLC Data RAM 356, is the Input Buffer 466 disabled and the Output Buffer 462 enabled. After the line is written, the Output Drive Control 464 in the Data ASIC 354 and the corresponding drive control (not shown) in the I-SLC Data RAM reverse state, thereby returning to the preconditioned state.

Instruction data to be written in the I-SLC Data RAM 356 is selected by Selector 468 from either the local Memory Subsystem as provided in the Input Buffers 430 or from the remote Segments as provided in a respective one of the Input Buffers 418 or 420. The selection is made based upon the request in process.

Figure 9:
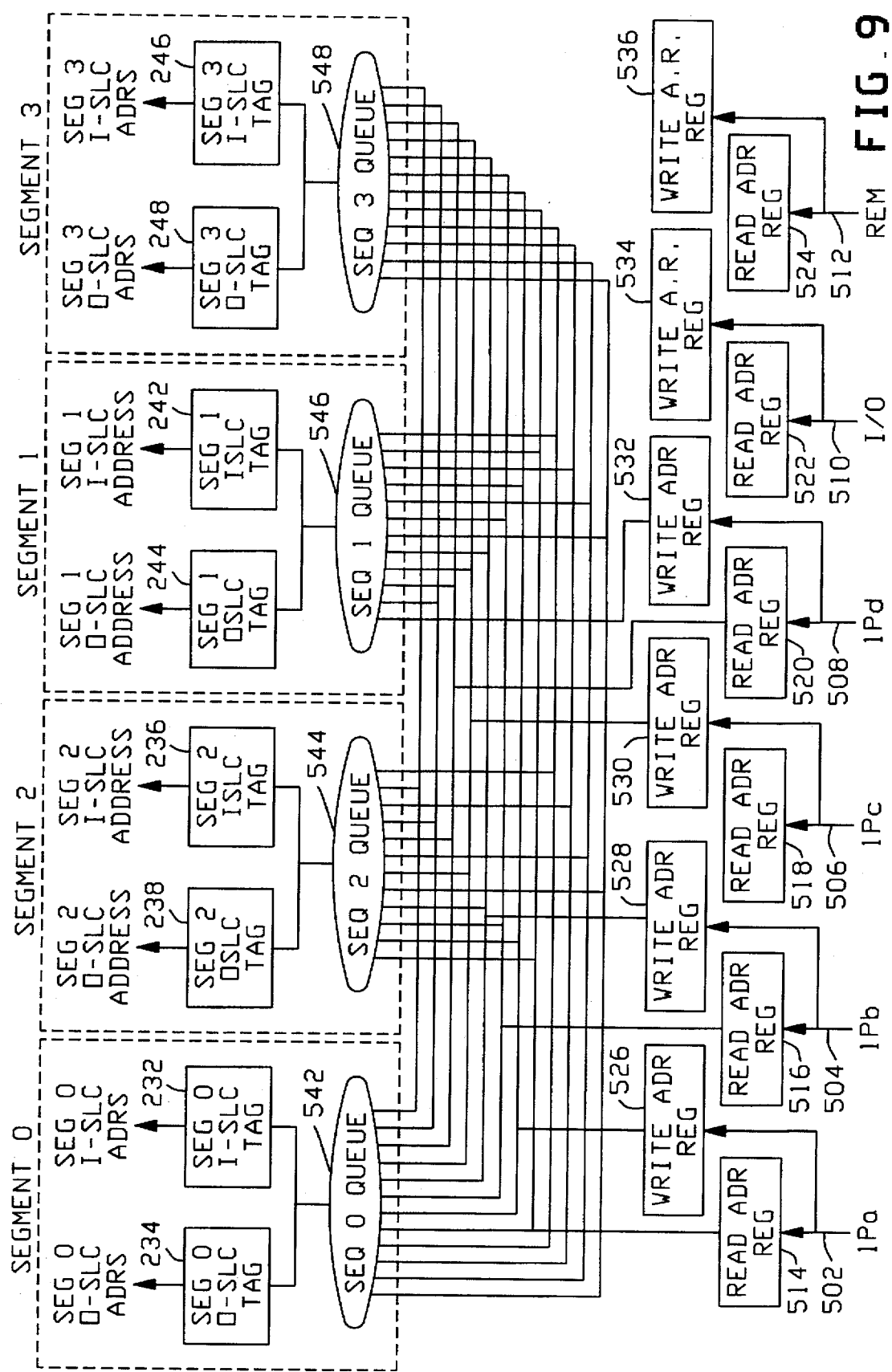
FIG. 9 is a block diagram of the overall address path of the exemplary system.

FIG. 9 is a block diagram of the overall address path of the exemplary system. There is a single address interface from each of the local IPs, the local I/O Subsystem, and the remote Address ASIC (e.g., 102, 104, 108, or 110) as shown respectively by address Lines 502, 504, 506, 508, 510, and 512. The address interface branches off into respective Read Address Registers 514, 516, 518, 520, 522, and 524, and into respective Write Address Registers 526, 528, 530, 532, 534, and 536. This means that each requester can have a single read and a single write request outstanding to the second-level cache before being acknowledged. Generally, the acknowledgment comes when the second-level cache has completed as request, thereby letting the requester know that it can send another request. There are separate acknowledgments for read and write requests.

After a request and its address are latched, the request and address are routed to one of the Segment Queues 542, 544, 546, or 548. There is a dedicated Segment Queue for each Segment 0-3 of the second-level cache. The Segment Queue to which the request is routed depends upon the requested address. Each of the Segments 0-3 operates independently and in parallel. That is, Segment 11 can be working on one request while Segment 1 is working on another request. Each of the Segments then selects an input request or a feedback request based upon the predetermined queuing priority and route the address to both the corresponding O-SLC Tag and the I-SLC Tag.

Figure 10:
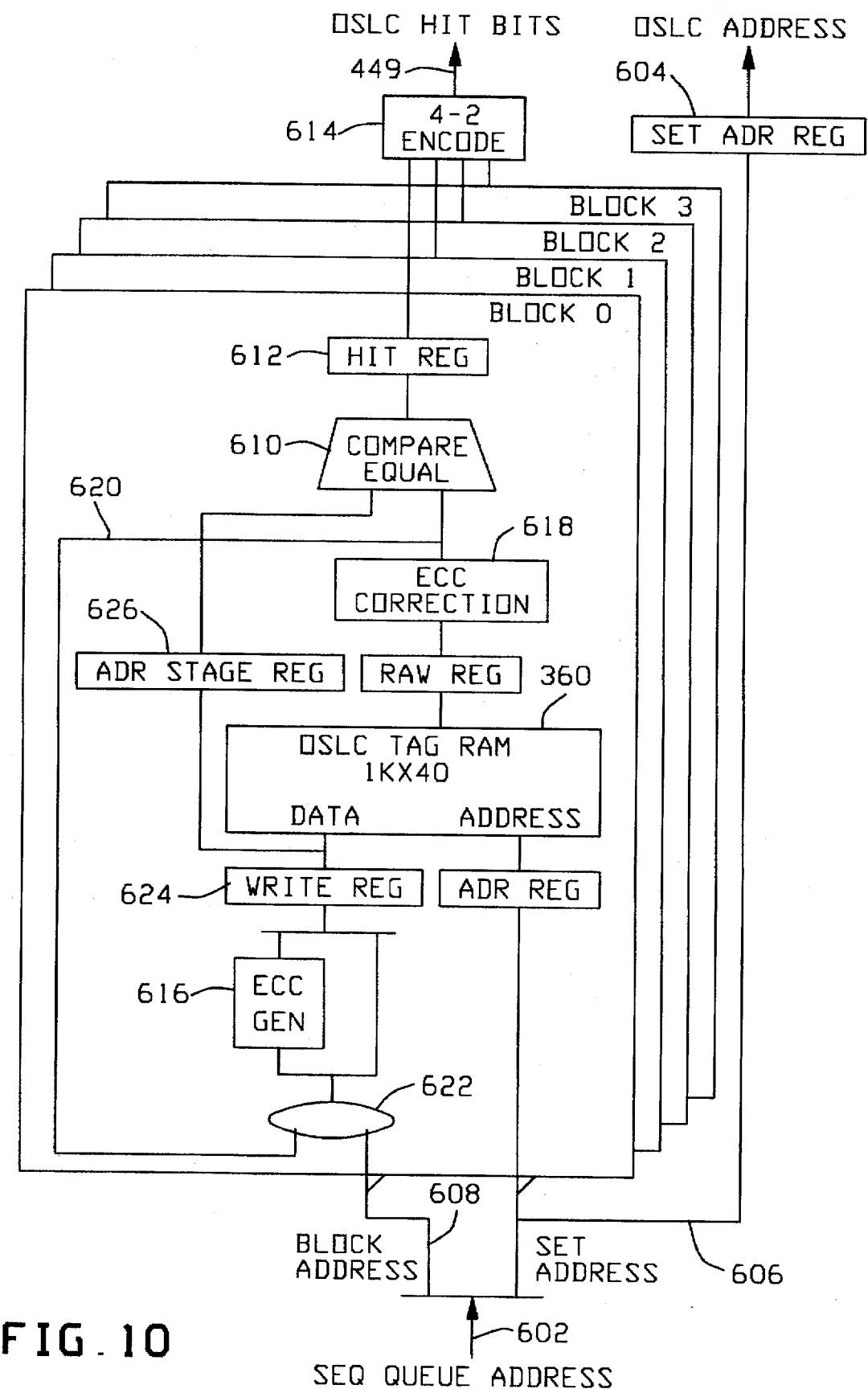
FIG. 10 is a detailed block diagram of an O-SLC Tag logic circuit.

FIG. 10 is a detailed block diagram of an O-SLC Tag logic circuit. The Segment Queue Address that is input on Line 602 is from a respective one of the Segment Queues 542, 544, 546 or 548. The set address field is routed to both the O-SLC Tag RAM 360 and to the O-SLC Data RAM 357. Set Address Register 604 latches the set address for the Data RAM. The second-level cache tag is divided into four parallel structures referenced as Block 0, Block 1, Block 2, and Block 3. Each Block consists of an embedded O-SLC Tag RAM 360, error correction logic, and compare logic.

The Segment Queue Address 602 is divided into a set address provided on Line 606 and a block address that is provided on Line 608. The set address is used to address the O-SLC Tag RAMs 360, and the block address is used to compare against the information stored in the O-SLC Tag RAMs. If the block address matches data read from the O-SLC Tag RAMs, then the data requested is located in the O-SLC Data RAM 357 and can be accessed there rather than in either the local or remote Memory Subsystems.

The O-SLC Tag RAMs 360 and the O-SLC Data RAM 357 are read in parallel, and the selection of the block is based on the results of the respective Compare logic circuits 610 that are stored in the respective Hit Registers 612. The respective outputs from the Hit Registers 612 are encoded by Encode logic 614 into Hit Bits 449 to select one of the blocks read from the O-SLC Data RAM if a hit occurs.

Single bit error correction and double bit error detection are provided with the ECC Generation logic circuit 616 and ECC Correction logic circuit 618. Feedback Path 620 is provided for read/update write operations. Selector 622 selects between data resulting from read/update write operations and a Block Address 608. Write Register 624 latches a block address for writing it to the O-SLC Tag RAM 360, and Staging Register 626 stages the input Block Address 608 for comparing the input Block Address with data read from the O-SLC Tag RAM.

Figure 11:
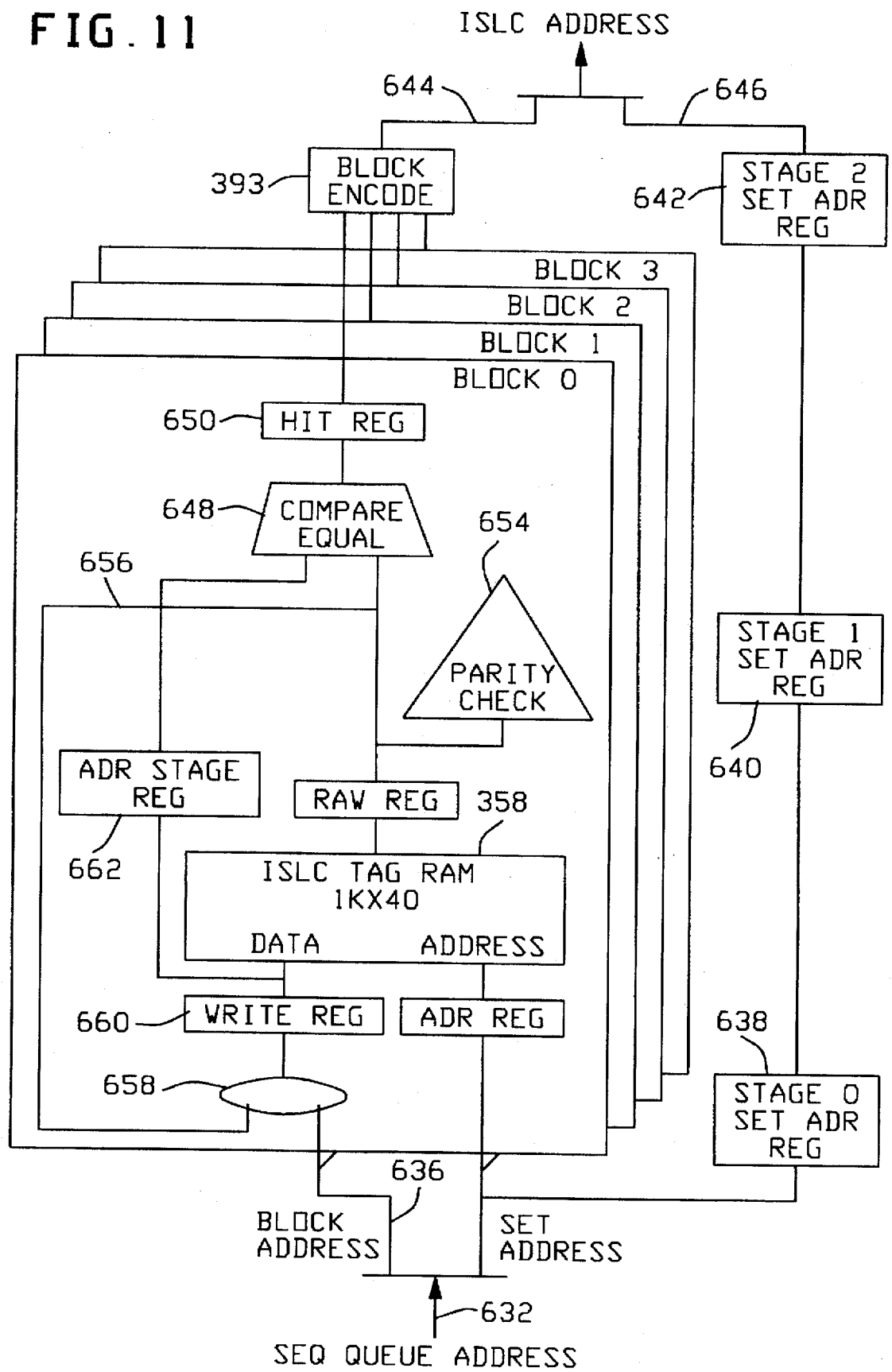
FIG. 11 is a derailed block diagram of an I-SLC Tag logic circuit.

FIG. 11 is a detailed block diagram of an I-SLC Tag logic circuit. The structure is essentially similar to the O-SLC Tag logic circuit of FIG. 10, except that them is no need for ECC correction. Parity detection, which is much faster and simpler, is used instead of ECC correction. If there is a parity error in an instruction mad from the second-level cache, the instruction may be read instead from the Memory 48.

The Segment Queue Address that is input on Line 632 is from a respective one of the Segment Queues 542, 544, 546 or 548. The set address field is routed to both the I-SLC Tag RAM 358 and to the I-SLC Data RAMs 356. The second-level cache tag is divided into four parallel structures referenced as Block 0, Block 1, Block 2, and Block 3. Each Block consists of an embedded I-SLC Tag RAM 358 and compare logic.

The Segment Queue Address 632 is divided into a set address provided on Line 634 and a block address that is provided on Line 636. The set address is used to address the respective I-SLC Tag RAMs 358, and the block address is used to compare against the information stored in the respective I-SLC Tag RAMs. If the block address matches data read from the I-SLC Tag RAMs, then the instruction requested is present in the second-level cache (one of the respective ISLC Data RAMs 356 and can be accessed there rather than in either the local or remote Memory Subsystems.

Three registers are used to stage the set address 634 before forwarding it to the I-SLC Data RAM 356. The three staging registers are designated as Stage-0 Set Address Register 638, Stage-1 Set Address Register 640, and Stage-2 Set Address Register 642. The staging of the set address ensures that the timing of the arrival of the encoded hit Lines 644 matches that of the set address on Line 646. This is required because the blocks of the I-SLC Data RAMs are not separate RAM structures as for the O-SLC Data RAMs 357.

The selection of the block is based on the results of the respective Compare logic circuits 648 that are stored in the respective Hit Registers 650. The respective outputs from the Hit Registers are encoded by Block Encode logic 393 into Hit Bits 644 to select a block to be read from the respective I-SLC Data RAM if a hit occurs.

Parity errors are detected by Parity Check logic circuit 654. Feedback Path 656 is provided for read/update write operations. Selector 658 selects between a new address made available on Line 632, which is used to search the I-SLC Tag RAM 358, and the new replacement address on Line 656, which is used to write into the I-SLC Tag RAM after a cache miss. Write Register 660 latches a block address that is the new replacement address for writing into the respective I-SLC Tag RAM 358. Staging Register 662 stages the input Block Address 636 for comparing the input Block Address with data read from the I-SLC Tag RAM.

In the exemplary system, the instruction second-level cache and operand second-level cache tag cycles operate in tandem. This simplifies maintaining cache coherency between the instruction and operand second-level caches. In addition, there is sufficient tag bandpass available to meet the request rate of all the requesters, with no significant performance loss relative to any speed advantage that might be obtained by operating the instruction and operation second-level cache tags as independent elements. However, it should be noted that the data portions of the instruction and operand second-level caches do not necessarily operate in tandem. This is because for a read, since the operand second-level cache is twice as wide as the instruction second-level cache, twice as many clock cycles are required by the instruction second-level cache to read a block. Therefore, a blocking scheme is used. The block scheme ensures that while the instruction second-level cache is reading data, future instruction second-level cache requests are blocked in the segment priority until the instruction second-level cache data read is complete. However, operand requests are allowed to flow into both the operand and instruction second-level cache tags when it is complete with its previous search.

Having described an exemplary embodiment of the invention in the drawings and accompanying description, those skilled in the art will recognize that various modifications to the exemplary embodiment could be made without departing from the scope and spirit of the claims set forth below:

We claim:

1. A cache architecture for a multiprocessor data processing system, the system including a plurality of processors and a memory for storing instructions that are executable by the processors and for storing operands that are readable and writable by the processors, the memory being shared between the processors and the processors generating requested addresses, the cache architecture comprising:

a plurality of store-through first-level caches, each one coupled to a respective one of the processors for receiving a requested address and having an instruction first-level cache and an operand first-level cache;

a post-store second-level cache coupled to each of said plurality of first-level caches for receiving a requested address and coupled to the memory, said second-level cache comprising
an instruction second-level cache capable of caching instructions requested by the processors; and
an operand second-level cache capable of caching operands referenced by the processors;
whereby cache replacement in said instruction second-level cache and cache replacement in said operand second-level cache occur independently.

2. The cache architecture of claim 1, further comprising:
a first selector coupled to said plurality of first-level caches for receiving the requested addresses, whereby one of the requested addresses is selected;
wherein said instruction second-level cache comprises
an instruction second-level cache tag memory coupled to said first selector for receiving a requested address;
an operand second-level cache tag memory coupled to said first selector for receiving a requested address, whereby reading of said operand second-level cache tag and said instruction second-level cache tag occur in parallel;
a first compare logic circuit coupled to said first selector for receiving a requested address and coupled to said instruction second-level cache tag for receiving data read from said instruction second-level cache tag, wherein said first compare logic circuit compares the requested address with output from said instruction second-level cache tag and generates an instruction-tag hit-signal;
a second compare logic circuit coupled to said first selector for receiving a requested address and coupled to said operand second-level cache tag for receiving data read from said operand second-level cache tag, wherein said first compare logic circuit compares the requested address with output from said operand second-level cache tag and generates an operand-tag hit-signal;
a second selector coupled to said second compare logic circuit for receiving said operand-tag hit-signal, wherein said second selector selects data associated with the requested address from the operand cache if the requested address is present in the second-level operand cache;
whereby data is selected from said operand second-level cache when a requested address is present in both said instruction second-level cache and said operand second-level cache.

3. The cache architecture of claim 1, further comprising:
a plurality of selectors, each coupled to said plurality of first-level caches for receiving the requested addresses, whereby one of the requested addresses is selected;
wherein said instruction second-level cache comprises
a plurality of instruction second-level cache tag memories, each coupled to a respective one of said selectors for receiving a requested address;
a plurality of operand second-level cache tag memories, each coupled to a respective one of said selectors for receiving a requested address;
a plurality of instruction second-level cache memories, each coupled to a respective one of said selectors for receiving a requested address;
a plurality of operand second-level cache memories, each coupled to a respective one of said selectors for receiving a requested address;

whereby address requests to different portions of memory may be processed in parallel.

4. A cache architecture for a multiprocessor data processing system, the system including a plurality of processors and a memory for storing instructions executable by the processors and for storing operands that are readable and writable by the processors, the memory being shared between the processors, the cache architecture comprising:
a plurality of store-through first-level caches, each one coupled to a respective one of the processors and having an instruction first-level cache and an operand first-level cache;
a first post-store second-level cache coupled to a first set of predetermined ones of said first-level caches and coupled to the memory, said first post-store second-level cache comprising
a first instruction second-level cache capable of caching instructions requested by respective ones of the processors coupled to said first set of first-level caches; and
a first operand second-level cache capable of caching operands referenced by respective ones of the processors coupled to said first set of first-level caches;
a second post-store second-level cache coupled to a second set of predetermined ones of said first-level caches, coupled to said first post-store second-level cache, and coupled to the memory, said second post-store second-level cache comprising
a second instruction second-level cache capable of caching instructions requested by respective ones of the processors coupled to said second set of first-level caches; and
a second operand second-level cache capable of caching operands referenced by respective ones of the processors coupled to said first set of first-level caches
whereby cache replacement in said first instruction second-level cache, cache replacement in said first operand second-level cache, cache replacement in said second instruction second-level cache, and cache replacement in said second operand second-level cache occur independently.

5. The cache architecture of claim 1 and further including:
a first selector coupled to said plurality of first-level caches to receive the requested addresses, whereby one of the requested addresses is selected as the selected address;
an instruction second-level cache tag memory coupled to said first selector to receive said selected address and to provide instruction tag signals indicative of which one or more instructions stored in said instruction second-level cache are associated with said selected address;
an operand second-level cache tag memory coupled to said first selector to receive said selected address and to provide operand tag signals indicative of which one or more operands stored in said operand second-level cache are associated with said selected address;
wherein said instruction second-level cache is coupled to said first selector and said instruction second-level cache tag memory to receive said selected address and said instruction tag signals, respectively, as an address to read said one or more instructions associated with said selected address;
wherein said operand second-level cache is coupled to said first selector to receive said selected address whereby a plurality of operands associated with said selected address are read from said operand second-level cache in parallel with said operand tag signals being read from said operand second-level cache tag memory;

compare logic coupled to said first selector and to said operand second-level cache tag memory to receive said selected address and said operand tag signals, respectively, to compare said selected address with said operand tag signals, and to generate operand tag hit signals if said selected address and said operand tag signals have a predetermined relationship; and a second selector coupled to said compare logic circuit to receive said operand tag hit signals, whereby said second selector selects one or more predetermined ones of said plurality of operands associated with said selected address if said operand tag hit signals are received.

6. The cache architecture of claim 5 and further including error detection and correction logic coupled to said operand second-level cache for detecting and correcting errors in said plurality of operands associated with said selected address substantially simultaneously with said operand tag signals being read from said operand second-level cache tag memory.

7. The cache architecture of claim 1, wherein said operand second-level cache is embedded within an integrated application specific integrated circuit and wherein said instruction second-level cache is implemented in discrete SRAM devices.

8. A cache architecture for a multiprocessor data processing system, the system including a plurality of processors and a main memory for storing instructions that are executable by the processors and for storing operands that are readable and writable by the processors, the main memory being shared between the processors and the processors generating requested addresses, the cache architecture comprising:

a plurality of store-through first-level cache means, each associated with a different one of the processors, for receiving a requested address from said associated processor, each of said store-through first-level cache means having associated first-level instruction cache means and associated first-level operand cache means for storing instructions and operands, respectively; and post-store second-level cache means for receiving requested addresses from the plurality of processors, said second-level cache including instruction second-level cache means for receiving requested addresses from requesting ones of the plurality of processors, for receiving from the main memory instructions associated with the requested addresses, for storing said received instructions, and for providing each of said received instructions to the associated requesting one of the plurality of processors and said associated first-level instruction cache means; and operand second-level cache means for receiving requested addresses from requesting ones of the plurality of processors, for receiving from the main memory operands associated with the requested addresses, for storing said received operands, and for providing each of said received operands to the associated requesting one of the plurality of processors and said associated first-level operand cache means;

whereby cache replacement in said instruction second-level cache means and said operand second-level cache means occur independently.

9. The cache architecture of claim 8, and further including:

first selection means for receiving requested addresses from predetermined ones of the plurality of processors and for selecting one of the requested addresses as the selected address;

wherein said post-store second-level cache means further includes instruction second-level cache tag storage means for receiving said selected address and providing instruction tag signals indicative of which instructions stored in said instruction second-level cache means are associated with said selected address; and operand second-level cache tag storage means for receiving said selected address and providing operand tag signals indicative of which operands stored in said operand second-level cache means are associated with said selected address, and whereby reading of said instruction second-level cache tag storage means and said operand second-level cache tag storage means occur in parallel.

10. The cache architecture of claim 9, and further including:

first compare means for receiving said selected address and said instruction tag signals from said first selection means and from said instruction second-level cache tag storage means, respectively, and for generating instruction-tag hit signals if said selected address is cached in said instruction second-level cache means; and second compare means for receiving said selected address and said operand tag signals from said first selection means and from said operand second-level cache tag storage means, respectively, and for generating operand-tag hit signals if said selected address is cached in said operand second-level cache means, and for causing said selected address to be read from said operand second-level means when said selected address is cached in both said instruction second-level cache means and said operand second-level cache means.

11. The cache architecture of claim 9, and further including:

selection means for receiving a plurality of the requested addresses from the plurality of processors and for selecting one or more predetermined ones of said plurality of received requested addresses as the selected addresses;

first compare means for receiving predetermined ones of said selected addresses and said instruction tag signals from said first selection means and from said instruction second-level cache tag storage means, respectively, and for generating associated instruction-tag hit signals for each of said predetermined ones of said selected addresses that are cached in said instruction second-level cache means; and second compare means for receiving predetermined ones of said selected address and said operand tag signals from said first selection means and from said operand second-level cache tag storage means, respectively, and for generating associated operand-tag hit signals for each of said predetermined ones of said selected addresses that are cached in said operand second-level cache means, and for causing said predetermined ones of said selected addresses that are cached in both said instruction second-level cache means and said operand second-level cache means to be read from said operand second-level means.

12. The cache architecture of claim 8, and further including:

first selection means for receiving the requested addresses and for selecting one of the requested addresses as the selected address;

instruction second-level tag storage means coupled to said first selection means for receiving said selected address and for providing instruction tag signals indicative of which instruction stored in said instruction second-level cache means is associated with said selected address;

operand second-level tag storage means coupled to said first selection means for receiving said selected address and for providing operand tag signals indicative of which operand stored in said operand second-level cache means is associated with said selected address;

wherein said instruction second-level cache means receives said selected address from said first selection means and said instruction tag signals from said instruction second-level cache tag storage means as an address for reading an instruction associated with said selected address;

wherein said operand second-level cache means receives said selected address for reading a plurality of operands from said operand second-level cache means in parallel with said operand second-level cache tag storage means reading said operand tag signals;

compare means for receiving said selected address and said operand tag signals, for comparing said selected address with said operand tag signals, and for generating operand tag hit signals if said selected address and said operand tag signals have a predetermined relationship; and second selection means for receiving said operand tag hit signals and for selecting predetermined ones of said plurality of operands read from said operand second-level cache means if said operand tag hit signals are received.

13. The cache architecture of claim 12 and further including error detection and correction means for detecting and correcting errors associated with said plurality, of operands in parallel with said operand tag signals being read from said operand second-level cache tag storage means.

\* \* \* \* \*